March 10, 1953 B. S. VILKOMERSON ET AL 2,631,197

MULTIPLE LOAD AMPLIFICATION SYSTEM

Filed March 1, 1949

INVENTORS
BENJAMIN S. VILKOMERSON
& FRED B. STONE
BY H. O. Newton
ATTORNEY

Patented Mar. 10, 1953 2,631,197

UNITED STATES PATENT OFFICE 2,631,197

MULTIPLE LOAD AMPLIFICATION SYSTEM

Benjamin S. Vilkomerson, Camden, and Fred B. Stone, Haddonfield, N. J., assignors to Radio Corporation of America, a corporation of Delaware Application March 1, 1949, Serial No. 79,076

3 Claims. (Cl. 179—171)

This invention relates to amplification systems, more particularly to amplification systems suitable for amplifying low levels of alternating electric signals such as audio frequency signals supplied by magnetic record transducing apparatus and the like.

Among the objects of the present invention is the provision of an improved amplification system capable of providing extremely high gain from a single amplification stage.

A further object of the invention includes the provision of an improved high gain amplifier having relatively low impedance output circuits as is desirable in certain amplifier installations.

An additional object of the invention is the provision of an improved amplification system which provides low impedance as well as high impedance output circuits for adapting the system to various uses.

Another object of the invention is the provision of a practical, high gain, low level amplification system for the amplification of low level signals supplied by magnetic record reproducing heads of magnetic record reproducing apparatus, such as those operated with a magnetic record track in the form of a thin stratum of finely divided magnetic particles held on a suitable movable support member.

A still further object of the invention is the provision of an improved amplification system having low impedance and high impedance output circuits in connection with a single amplification stage, the high impedance output circuit being connected with frequency-responsive, signal amplitude varying elements, and the low impedance output circuit being connected to supply signals thus varied in amplitude to further amplification elements, whereby a dual function or operation is obtained without the addition of further components.

Figure 1:
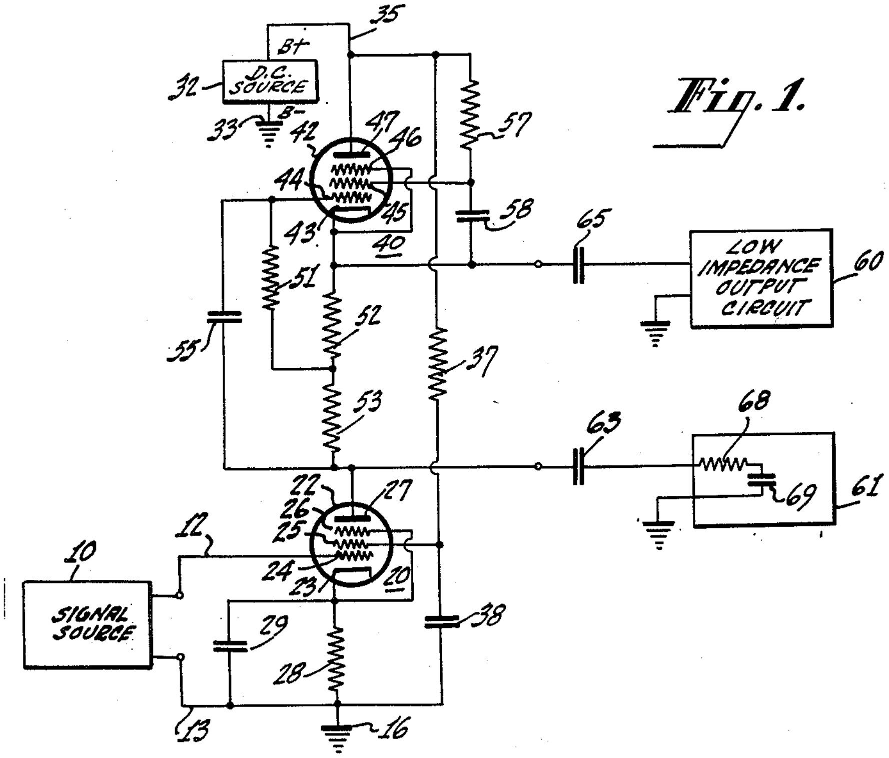
Figure 2:
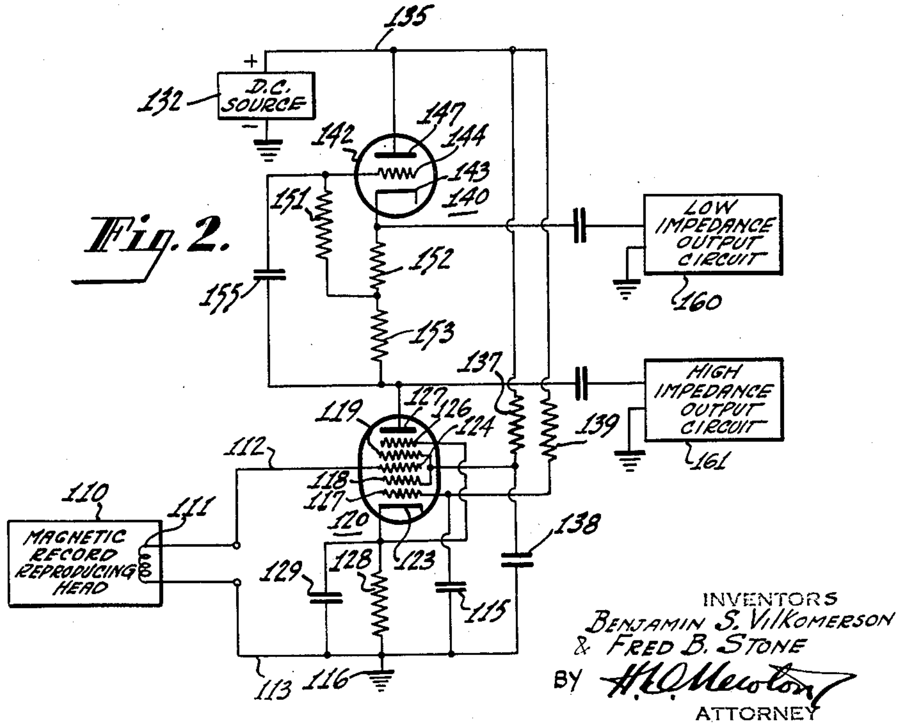

The above as well as other objects of the invention will be more readily understood from the following description of exemplifications thereof, reference being had to the accompanying drawing wherein:

Figure 1 is a circuit diagram of one form of amplification system illustrating the invention; and Figure 2 is another form of amplification circuit embodying the invention.

According to the invention, practical forms of high gain amplification circuits are provided by combining a high impedance amplification stage, with a high impedance amplified signal load in the form of a separate amplification section including a signal degenerating circuit. The degenerating circuit provides a high gain, low impedance output circuit in addition to the high impedance output circuit across the entire amplified load impedance. The high impedance output circuit may be used for connecting frequency responsive amplitude compensating networks to the system for compensating purposes while the compensated output signals may be taken from the low impedance output circuit.

Figure 1 is an example of one form of the invention in which a signal source 10 shown in block form, has output leads 12, 13 supplying signals to be amplified to an amplification section 20. Section 20 is shown as a screen grid electron discharge amplification circuit having an electron discharge tube 22 which includes an electron emissive cathode 23, an input grid electrode 24, a screen grid electrode 25, a suppressor grid electrode 26, and an anode 27. By the expression "screen grid electron-discharge amplification circuit" is meant any amplification circuit including an electron discharge tube such as a tetrode, pentode, hexode etc. having at least one electron-accelerating electrode in addition to the usual cathode, anode, and control grid.

As is well known, when the cathode 23 is heated, as by a separate electrical heating filament (not shown), and a direct current (D.-C.) potential is applied between the anode 27 and cathode 23, an electron discharge in the form of an electron flow will take place between these electrodes. Electrical signals applied between the input grid 24 and cathode 23 will vary the electron flow to the anode causing the flow to exhibit changes corresponding to amplifications of the signals. For such operation, signal input lead 12 is connected to input grid 24, and input lead 13 is connected to the cathode 23 by means of a signal return or ground conductor represented at 16 and cathode resistor 28, by-passed for signals by capacitor 29.

The D.-C. electron-discharge-energizing potential is supplied to the electrodes by D.-C. source 32, the negative terminal (B—) of which is grounded as indicated at 33, and the positive terminal (B+) of which is connected to anode 27 by means of a lead 35, a load impedance in the form of a network indicated generally at 40, and a series resistance 53. The network 40 includes an additional electron-discharge tube 42 having an anode 47, a cathode 43, a control grid 44, a cathode resistance 52 connected between the cathode and a resistance 51 which returns from the control grid 44. The network 40 has its anode and cathode connected in series between energizing lead 35 and the resistance 53.

The suppressor grid 26 is operated at the potential of its cathode 23, by directly connecting these electrodes, as shown. For providing the high D.-C. potential at which the screen grid 25 is maintained, a resistance 37 establishes a D.-C. connection between the screen grid and the B+ lead 35. By-pass capacitor 38 connected between the screen grid and the signal return 16, keeps alternating current (A.-C.) signals from developing at this electrode. Suitable D.-C. bias voltage is maintained between the control grid 24 and cathode 23, by the D.-C. voltage drop across resistor 28 when electron-flow energizing current passes through it. A D.-C. return from grid 24 to conductor 16 is provided by any convenient means (not shown) which may be included in the signal source 10. By-pass capacitor 29 minimizes the development of A.-C. signals across the cathode return resistance 28 and reduces any tendency for the signal strength of the incoming signals applied between control grid 24 and ground to be diminished by reason of its series impedance.

When A.-C. signals are impressed between input leads 12, 13, the electron discharge between anode 27 and cathode 23 in tube 22 will show amplified variations corresponding to the impressed signals, and any signal impedance connected in series with this discharge will develop between its terminals a corresponding highly amplified output signal voltage. The higher the signal output impedance, the higher will be the effective amplification up to the limit of the tube 22, providing the D.-C. operating voltage of anode 27 is not unduly reduced by the D.-C. voltage drop due to the series connection of the impedance in the anode lead to the D.-C. source 32.

According to the invention, the network 40 and series resistor 53 form the output signal load impedance. The tube 42 is itself connected as an amplifier and is shown as of the screen-grid type similar to tube 22. In addition to the cathode 43, anode 47, and control grid 44, tube 42 contains a screen grid 45 and a suppressor grid 46. A capacitor 55 connects the control grid 44 to the anode 27 for impressing between this grid and its cathode 43, A.-C. voltage changes corresponding to signal amplifications developed by the network 20. Screen grid operating potential is shown as supplied by a resistor 57 connecting the screen grid 45 with the B+ lead 35, and a capacitive by-pass 58 returning this grid to the cathode 43. The suppressor grid 46 is directly tied to the cathode 43.

A feature of the invention is that the circuit combination of the resistance 53 and the amplification section 40 provides a practical form of extremely high effective impedance for the amplified signals developed by amplification section 20. This will be more readily appreciated when it is considered that amplification by tube 42 has an effect on the electron discharge current opposite to that of tube 22 by reason of the phase reversing action of the amplifiers. During those portions of the incoming A.-C. signal when the control grid 24 becomes more positive, the electron discharge current between anode 27 and cathode 23 is increased thereby lowering the D.-C. voltage at the anode, that is, rendering the anode voltage less positive with respect to ground. At the same time this lowering of the anode voltage is applied as a negative voltage excursion to control grid 44 by means of capacitor 55, and has the effect of lowering the electron-discharge current between anode 47 and cathode 43 of tube 42. In other words, any attempt by amplification section 20 to change the electron-flow current is opposed by a corresponding and simultaneous attempt by tube 42 to change the electron-flow in the opposite direction. Stated differently, the electron-flow circuit shows considerable resistance to the passage of A.-C. signals, exactly as required for high gain operation of amplifier 20. This high effective signal-resistance is accompanied by a relatively low resistance to direct current so that the D.-C. operating potential of anode 27 can be maintained quite high as required for high gain with practical D.-C. voltage supplies.

As is well known, screen-grid types of amplifiers, such as amplifier 20, have much higher maximum gain limits than amplifiers of the triode type, which have no screen grid. The suppressor grid is an adjunct for optimum operation of the amplifier, but can be omitted without detracting appreciably from the maximum gain possible. Unfortunately, however, the amplifier tube 42 and its connecting elements do not form a directly practical or suitable circuit for realizing the highest gain, without the resistance 53 between the anode 27 and the D.-C. return connection of grid 44. In the absence of this resistance portion 53, the signal impedance presented to the amplified output of tube 22 is not as high as would be indicated by the opposed electron-flow effects described above. A possible explanation for this is the relatively low impedance presented between cathode 43 and anode 47 by the screen-grid circuit elements 57, 58. Capacitor 58 which is intended to prevent the appearance of A.-C. signals between the screen grid and the cathode, is of negligible impedance to signals, while resistance 57 is generally of the order of a few hundred thousand ohms. Resistance section 52, which provides the bias potential for control grid 44, is not more than an insignificant few thousand ohms. The combination of these impedances is much lower than that needed for gains in excess of those realizable from conventional circuits using a single amplification tube.

It has been discovered that amplified signal impedances higher than one megohm, as well as exceptionally high gain, are available according to the circuit construction of the invention, by including the resistance 53 to provide a resistance of at least about 5000 to 10,000 ohms or about 5 or more times as much as is required for suitably biasing the control grid 44 with respect to its cathode 43. The apparent effect is to cause the appearance across resistance portion 53 of an appreciable signal voltage by reason of the electron-flow through it as well as by the amplification action of tube 42. This amplification which is of the well known cathode follower type, causes the signal potential at cathode 43 to follow or degenerate, though not quite fully, the alternating signal potentials of grid 44 or anode 27. It can be considered therefore that the impedance between cathode 43 and the B+ lead 35 is presented not to the entire amplified signal voltage at anode 27, but only to the difference between the anode signal voltage and the degenerating voltage developed at cathode 43 by reason of the amplification in circuit 40. The degenerating effect appears in this manner to magnify the effect of impedance elements 57, 58. In other words the output impedance appears to be multiplied in accordance with the degree of degeneration. Where the degeneration is 90 percent, it would therefore follow that the output impedance is applied to only 10 percent of the signals at anode 27, that is, is effectively multiplied by a factor of 10.

The amplification circuit of the invention provides the startling gain of about 1500 or more times in signal strength, using a single ordinary D.-C. source 32 supplying current at a potential of about 250 volts to furnish all the D.-C. requirements.

Another feature of the invention is the fact that the highly amplified signals can be taken from two different parts of the circuit, one furnishing a high impedance output connection and the other a low impedance output connection. As shown in Figure 1 an output circuit 61 connected as by coupling capacitor 63 to the anode 27, provides a high impedance signal output circuit. At the same time an output circuit 60 connected as by coupling capacitor 65 to the cathode 43, provides a low impedance signal output circuit. Circuit 61 exhibits signal impedances of more than one megohm, while circuit 60 shows signal impedances of about 50,000 ohms or less. Both circuits, however, supply amplified signals of about the same level, and can be used simultaneously or independently. The gain of the entire stage closely approaches the maximum theoretical gain (amplification factor) of the tube 22 in section 20.

An extremely effective technique for utilizing the dual output circuits, according to the invention, is to connect the low impedance circuit 60 to additional stages of amplification, and to connect high impedance circuit 61 as a frequency-responsive amplitude adjusting network, where such adjustment is desired. In this way the signal supply for further amplification picks up very little undesired hum or other noise, by reason of the low impedance to ground, and the frequency-responsive amplitude adjustments can be made with small capacitances and high resistances. Only about one-twentieth of the capacitances necessary to adjust the response of circuit 60, is needed for the corresponding adjustment of circuit 61. This effects a considerable decrease in the cost of the capacitance. The higher impedance of the adjusting elements also means that less signal energy is dissipated by them so that the maximum gain can be more readily realized.

By reason of the high gain, the apparatus of the invention is especially suited for amplifying low level signals. Signals having levels of less than one millivolt can be directly amplified and brought to the one volt level. The guarding against pick-up of hum and noise is confined to a small number of circuit zones and thereby considerably simplified.

A particularly effective embodiment of the invention is the combination of the amplifier of Figure 1 in a magnetic record transducing apparatus especially of the type that transduces records in the form of magnetic variations on a record member having a thin stratum of finely divided magnetic particles held on a suitable carrier. Such magnetic record transducers are available in the open market and are described in the February, 1948 issue of Radio News, on pages 56, 57, 58, and 131 to 140 inclusive. U. S. Patent No. 2,247,847, dated July 1, 1941, more generally describes magnetic record systems. A characteristic of these instruments is that the signals picked up by a magnetic record reproducing head are of extremely low level, and require equalization to adjust their frequency response for faithfully reproducing the signals as they were supplied for recording.

In accordance with the present invention, the signal source 10 of Figure 1 may be a magnetic record reproducing head of any suitable style. A practical form for such a head is described in the above Radio News publication. The varying magnetic flux to which the head is exposed induces electrical signals in a suitable signal pick-up winding as is well known, and the signal output therefrom as impressed on the leads 12, 13.

The amplitude adjustment or equalization of reproduced magnetically recorded signals is described in the above-identified Radio News article. At least a part of the desired equalization may be provided by the circuit 61. As shown, a series connected capacitor 67 and resistor 68 can be effectively used for reducing the amplitudes of high frequency signal components. The circuit 60 is arranged to include further amplification stages for amplifying the equalized signals and reproducing them as by a loudspeaker (not shown). The entire combination is exceedingly effective and highly satisfactory in operation.

Figure 2 shows a modification of the invention in which the output load section is in the form of a triode amplification network 140 and the screen-grid section provides a low microphonic network 120. The other components of this modification are similar to those of Figure 1 and are indicated by corresponding reference characters. Triodes inherently have lower alternating current resistance between their anode 147 and cathode 143, and the degenerating impedance 153 contributes an increase in output load resistance for the screen grid amplification section 120, corresponding to the increase described in connection with Figure 1.

The screen-grid section 120 has its input leads 112, 113 connected to the pick-up windings 111 of a magnetic record reproducing head 110. A pentagrid electron-discharge tube 122 having an anode 127, a cathode 123 and five grids 117, 118, 124, 119 and 126 is incorporated in section 120. The tube 122 may be of the type generally used for mixing or heterodyning two signals. The innermost grid 117 adjacent the cathode 123 which is generally an oscillator grid, or an input grid for one set of signals to be mixed, is suitably biased as by a high resistance 139 connecting it to the B+ lead 135 and is by-passed to ground by capacitor 115. A very small positive bias voltage is all that is needed. The next outer grid 118 and the fourth grid 119, which are generally connected together as a screen grid combination, are suitably energized through series screen resistor 137, and by-pass capacitor 138. The third grid 124, which is usually the input grid for a second set of signals to be mixed, is connected as the signal input grid to lead 112, and the fifth grid 126 as a suppressor grid. The second grid 118 is not required for the desired operation and may therefore be omitted. Many commercial pentagrid tubes, however, include such a grid.

Most of the so-called microphonic influences appear to cause the generation of undesired signals as a result of physical vibration of the grid nearest the cathode when this grid is connected as the signal input grid. In high gain amplifier tubes, this innermost grid is very close to the cathode, and vibrations of even small amplitude are of considerable effect on the electric field between the cathode and the signal grid. Such vibration may result from the acoustic effects of the signal itself, or may be induced mechanically independently of the signal. By using one of the outer grids as the signal input grid, microphonic tendencies are usually considerably diminished. In some cases care must be taken to use a tube having its signal input grid supported in a manner that adequately reduces vibrating tendencies. Because of the high gain available, the guarding against microphonic operation is sometimes very important and even indispensable.

In the circuits of Figure 1 or 2 the different tube sections have their input bias voltages adjusted for any suitable ratio of anode-to-cathode impedance. For such adjustment the cathode bias resistors 28 and 52 or 128 and 152 may be selected to provide the desired voltage drop. The input bias voltages of the two sections may be the same or different.

The screen grid 45 of the output loading section 20 may be capacitively by-passed to the B+ lead 35 or anode 47, instead of the cathode 43, without substantially affecting the operation. The impedance between the cathode 43 and screen grid 45, even in the absence of the shunting by-pass capacitor 50, is still sufficiently low to seriously lower the gain of the stage unless the degenerating impedance 53 is supplied. This degenerating impedance need not be a resistor as shown, but may be in the form of an inductance, or a combination of resistance and inductance. Resistors are less expensive, however, and do not greatly lower the direct current voltage available at the anode 27 of section 20.

When an inductive degenerating impedance is used, the input grid of the loading section 40 or 140 may be connected to receive the amplified signals developed by section 20 or 120, through another inductance magnetically coupled to the degenerating impedance so as to form a transformer-coupled linkage. Alternatively the amplified signals may be supplied to the loading section through a coupling capacitor connected to the end of the degenerating inductance that is joined to the plate of the amplification section, as in the construction of Figure 1 or 2. In place of the inductive signal input through inductance 11 as shown in Figure 1, any other type of signal input connection, such as resistance-capacity coupling, is suitable. The signals are then applied through a coupling capacitor, and a grid return resistance completes the direct current input grid return, as in the input connections to tube 42.

By reason of the high gain of the amplification systems of the invention it is advisable to take additional precautions to reduce the pick-up of undesired noises and signals. Thus, the 60 cycle per second electric and magnetic fields that are associated with the commercial alternating electric power lines, are quite prone to interfere with desired signals of corresponding frequencies. In the low-microphonic arrangement of Figure 2, the second signal input grid 124 (the third grid) is of relatively large diameter, as described in Terman's Radio Engineer's Handbook, copyright 1943, by McGraw-Hill Book Co., pages 570 and 571. This type of input circuit is more susceptible to the introduction of hum pickup apparently because the larger dimensions of the signal-carrying grid are more efficient in developing electrical signals in response to stray magnetic fields. Magnetic shielding of the tube will be very effective in reducing such stray pick-up. Furthermore the connection of an equalizing capacitor such as is shown at 69 in Figure 1, at the grounded end of the equalizing circuit, rather than the high voltage end, also reduces stray pick-up apparently because the equalizing capacitor is generally larger in size than an equalizing resistor and is accordingly a more effective pick-up. By placing this capacitor on the grounded side of the circuit, it is kept at a point of lower impedance and stray signals are not picked up as readily at low impedance portions of a circuit. For resistance capacity equalization, the coupling capacitor 63 is not needed and should be omitted.

The relatively low stray pickup that the invention makes practical to build into high-gain audio amplifiers is highly effective for use with magnetic types of phonograph pick-ups. Here the low level signals supplied by the pick-up also require relatively high amplification. In such an arrangement, a power output stage may be directly operated with the pick-up signals as amplified by the single stage of the invention. Equalization may also be supplied, as indicated above, to compensate for non-linear recording and/or pick-up response characteristics.

Attention is called to the fact that the cathodes 23, 43 are usually heated by closely positioned electrical heaters and that where both heaters are connected together for operation at a common potential, care should be taken to avoid unnecessarily large potential differences between the heaters and their respective cathodes. The cathodes themselves are operated at different potentials and the difference in potential may be high enough to cause electron discharge between one of them and its heater, or between both of the cathodes by way of a common heater connection.

To avoid this difficulty, commonly connnected heaters may be biased to a D.-C. voltage, with respect to ground, intermediate the D.-C. voltage of the two cathodes. Alternatively separately connected heaters insulated from each other may be used.

Another feature of the invention is the low level of noise which the circuits of the invention introduce aside from stray pickup. It is well known that in the conventional amplification of low level signals the introduction of noise is quite serious when inexpensive non-metallic plate or anode supply resistors are used. This appears to be due to the nature of the electrical contact between large numbers of non-metallic particles in such resistors. The substitution of a metallic or so-called wire-wound plate resistor is generally discouraged by reason of the enormous cost of such resistors which would have to have a resistance of the order of a million ohms. It has been discovered that an electron-discharge tube when used as part or all of a plate supply resistance in accordance with the inventions is not only less expensive than a wire-wound resistor, but is fully as effective in reducing noise as a wire-wound resistor. The noise introduction due to an inexpensive degenerating resistor 53 together with a biasing resistor 52 is not appreciable inasmuch as these resistors contribute only a few percent of the total plate resistance for amplification section 20 or 120, and the noise injection is dependent upon the resistance of the non-metallic resistor. If desired, however, where the degenerating impedance is in the form of a resistor, it may be of the wire-wound type. Wire-wound resistors having such relatively low resistance are not very expensive.

Without in any way limiting the present invention, there are given below the circuit constants of a practical amplifier of the type shown in Figure 1. This will simplify the construction and use of the invention by those skilled in the art.

Resistors:
- 28, 1700 ohms
- 37, 1 megohm
- 51, 2.2 megohms
- 52, 1200 ohms
- 53, 56,000 ohms
- 57, 47,000 ohms Capacitors:
- 29, 40 microfarads
- 38, 0.5 microfarads
- 55, 0.01 microfarads
- 58, 0.5 microfarads Tubes:
- 22, type 6SJ7
- 42, type 6SJ7

It was found that a gain of at least 1250 times could be obtained from this circuit with a D.-C. source 32 of the order of 250 volts. The high impedance output circuit had an effective impedance of about 1¼ megohms. The low impedance output circuit had an effective impedance of about 18,000 ohms.

While several exemplifications of the invention have been indicated and described above, it will be apparent to those skilled in the art that other modifications may be made without departing from the scope of the invention as set forth in the appended claims.

What is claimed:

1. In an amplification system for amplifying alternating electric signals, the combination comprising first and second electron tubes each having a cathode, a control grid and an anode, the anode-cathode impedances of said tubes being connected serially, and a source of operating potential connected across said serially connected tubes, a cathode biasing impedance element and a degenerative impedance element of higher impedance than said cathode biasing impedance element connected in series between the anode of said first tube and the cathode of said second tube, a relatively high impedance element providing a direct current path connected between the junction of said cathode biasing impedance element and said degenerative impedance element and the control grid of said second tube, said relatively high impedance element being of higher impedance than said degenerative impedance element, a signal input circuit coupled to the control grid of said first tube, a first load circuit connected to the anode of said first tube, and a second load circuit connected to the cathode of said second tube.

2. In an amplification system, the combination as defined in claim 1, in which the first tube includes a screen electrode, in which said screen electrode and the anode of the second tube are resistively coupled, and in which said screen electrode and the cathode of said first tube are capacitively coupled.

3. In an amplification system, the combination as defined in claim 1, in which the second tube includes a screen electrode, in which said screen electrode and the anode of said second tube are resistively coupled, and in which the cathode of said second tube and said screen electrode are capacitively coupled.

BENJAMIN S. VILKOMERSON.
FRED B. STONE.

REFERENCES CITED

The following references are of record in the file of this patent:

UNITED STATES PATENTS

| Number | Name | Date |
|---|---|---|
| 2,113,332 | Morse et al. | Apr. 5, 1938 |
| 2,241,534 | Blumlein | May 13, 1941 |
| 2,305,919 | Eaton | Dec. 22, 1942 |
| 2,310,342 | Artzt | Feb. 9, 1943 |
| 2,326,614 | Bowman | Aug. 10, 1943 |
| 2,358,428 | White | Sept. 19, 1944 |
| 2,424,893 | Mansford | July 29, 1947 |
| 2,517,863 | Froman | Aug. 8, 1950 |